United States Patent [19]
Canning

[11] 3,782,698
[45] Jan. 1, 1974

[54] HEATER-MIXER FOR STORED FLUIDS

[75] Inventor: Thomas N. Canning, Sunnyvale, Calif.

[73] Assignee: The United States of America as represented by the Administrator of the National Aeronautics and Space Administration, Washington, D.C.

[22] Filed: Aug. 11, 1972

[21] Appl. No.: 280,032

[52] U.S. Cl............................ 259/60, 62/45, 165/2, 165/109, 259/DIG. 18
[51] Int. Cl............................................... F17c 5/04
[58] Field of Search.......................... 62/48, 45, 514; 259/1 R, 60, DIG. 18; 165/2, 109

[56] References Cited
UNITED STATES PATENTS 1,863,958  6/1932  Wulff et al................................ 62/48
3,588,312  6/1971  Burnier................................. 62/514

Primary Examiner—William I. Price
Attorney—Darrell G. Brekke et al.

[57] ABSTRACT

A fluid storage vessel for containing cryogenic fluids including an auxiliary chamber within the storage vessel. The auxiliary chamber is connected in fluid communication with the main storage vessel by means of a jet nozzle. The wall of the auxiliary chamber is heat cycled to produce a corresponding expansion and contraction of the fluid within the auxiliary chamber to produce heating and mixing of the stored fluid by means of jetting the expanded fluid to and fro relative to the stored fluid contents of the vessel.

8 Claims, 1 Drawing Figure

PATENTED JAN 1 1974    3,782,698
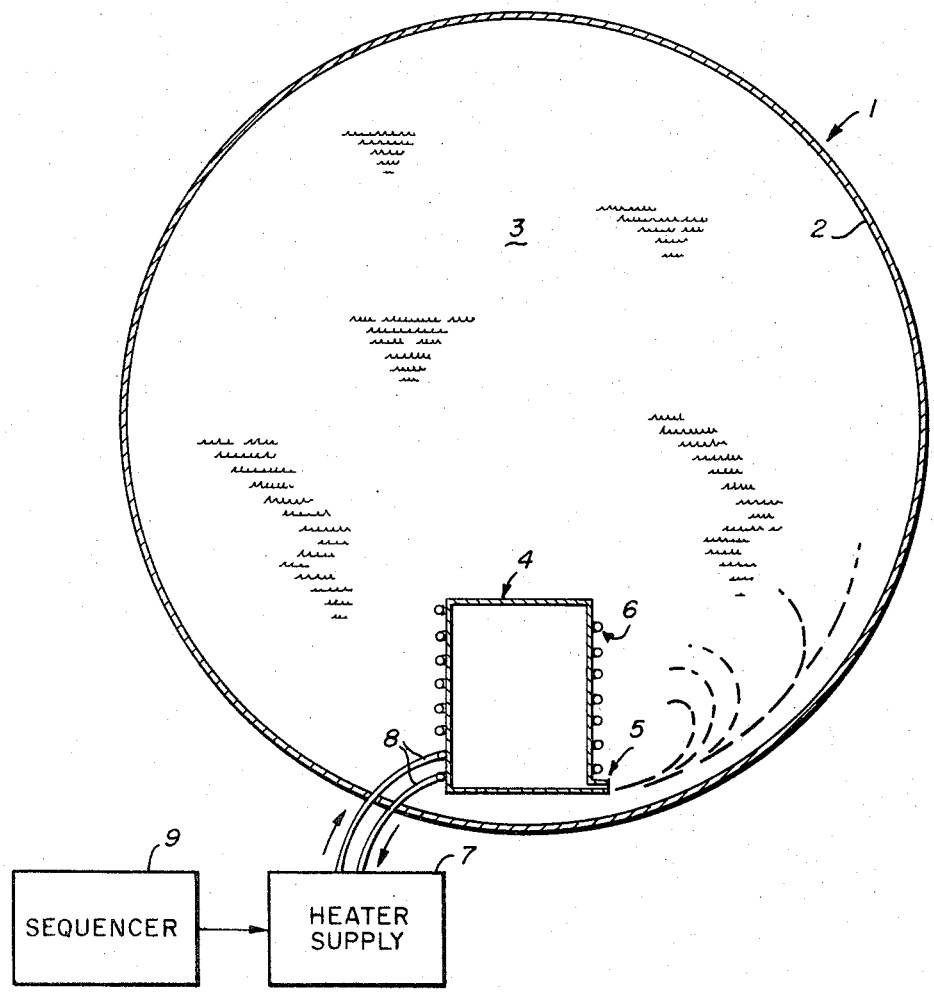

HEATER-MIXER FOR STORED FLUIDS

GOVERNMENT RIGHTS

The invention described herein was made by an employee of the United States Government and may be manufactured and used by or for the government for governmental purposes without the payment of any royalty thereon or therefor.

BACKGROUND OF THE INVENTION

The invention relates to heating and mixing devices for stored cryogenic fluids.

Heretofore, stored cryogenic fluids have been mixed in storage by means of a motor driven impeller located in the storage vessel. Such motor driven impeller systems require that hazardous materials and electrical circuits be installed inside the fluid storage tanks. In addition, such motor driven impeller systems involve a relatively heavy structure, especially when use of such systems is contemplated for mixing and heating rocket fuel and oxydizers for space exploration and the like, where prolonged periods of "weightlessness" (and hence absence of natural convection) are encountered.

It is also known from the prior art that fluids can be pumped from a storage tank or from one tank to another by means of a heat pump which includes a chamber in fluid communication with a system to be pumped. Fluids confined in the chamber are heated by heating the chamber, which in turn produces an expansion of the fluid. A check valve arrangement allows the expanding fluid to be expelled from the chamber and thus pumped into a utilization device. Upon cooling, the remaining fluid within the pumping chamber contracts allowing new fluid to be drawn from the supply into the pump. The cycle is repetitive to produce a continuous pumping action. Examples of such heat cycle pumps are disclosed in U.S. Pat. No. 1,063,636, issued June 3, 1913, U.S. Pat. No. 1,686,887, issued Oct. 9, 1928, U.S. Pat. No. 3,087,438 issued Apr. 30, 1963, and U.S. Pat. No. 3,083,257, issued Mar. 26, 1963.

SUMMARY OF THE PRESENT INVENTION

The principal object of the present invention is the provision of an improved heater-mixer for stored fluids.

In one feature of the present invention, an auxiliary chamber is disposed within a fluid storage vessel in heat exchanging relation with the fluid stored within the vessel. A fluid passageway interconnects the auxiliary chamber with the storage vessel. Heat cycling of the chamber produces expansion and contraction of the fluid within the chamber causing the heated fluid to be expelled through a nozzle into the storage vessel to produce mixing and heating of the stored fluid.

In another feature of the present invention, the fluid being stored is a cryogenic fluid and the heating element is carried on the walls of the auxiliary chamber.

Other features and advantages of the present invention will become apparent upon a perusal of the following specification taken in connection with the accompanying drawing.

BRIEF DESCRIPTION OF THE DRAWING

The drawing is a longitudinal sectional view, partly in block diagram form, of a fluid storage apparatus including features of the present invention.

DESCRIPTION OF THE PREFERRED EMBODIMENTS

Referring now to the drawing, there is shown a fluid storage apparatus 1 incorporating features of the present invention. The fluid storage apparatus 1 includes a fluid storage vessel 2, such as a spherical (cryogenic) pressure vessel, made of a material which is inert to the fluid 3 such as oxygen to be stored therein.

An auxiliary chamber 4 is immersed within the fluid 3 within the storage chamber 2. The auxiliary chamber 4 has a volume which comprises a substantial portion of the volume of the entire storage vessel 2. The inside of the auxiliary chamber 4 is placed in fluid communication with the stored fluid 3 via the intermediary of one or more jet nozzles 5 communicating through the wall of the auxiliary chamber 4. The nozzles 5 are arranged for producing a jet stream of fluid which is expelled from the interior of the auxiliary chamber 4 through the nozzle into the storage vessel 2.

A heating element 6, such as an electrical resistance heater or tubulation for circulation of a heating fluid therethrough, is disposed in heat exchanging relation with the wall of the chamber 4. A suitable heater supply 7 supplies heating energy to the heating element 6 via a wire or conduit 8. A sequencer 9 controls operation of the heater supply 7 to produce cyclical heating of the auxiliary chamber 4 and fluid contents thereof.

In operation, a significant fraction of the fluid stored within the storage vessel 2 is contained within the auxiliary chamber 4. Upon energizing the heating element 6, as by passing current or warming gas or liquid through the element 6, the walls of the auxiliary chamber are heated. The fluid contained within the auxiliary chamber, by virtue of being enclosed by the heated walls of the chamber 4 is more rapidly heated than the remaining fluid 3 contained within the storage vessel.

Upon heating the fluid contained within the auxiliary chamber, the fluid expands and is expelled through the jet nozzle 5 into the remaining stored fluid as a jet stream. This jet stream transports its excess energy and delivers it efficiently throughout the large region of the storage vessel 2. The induced motion of the fluid within the storage vessel extends throughout the entire interior of the vessel 2 and tends to make the entire stored contents thereof isothermal.

When the heating element 6 is de-energized, the residual conduction of the swirling stored fluid cools the walls of the auxiliary chamber 4 and the fluid contained therein. The resultant tendency for the cooled fluid within the chamber to condense draws fluid back through the nozzle 5 into the auxiliary chamber to complete the operating cycle of the heating and mixing device. The sequencer causes the system to be operated cyclically with a selected duty cycle so as to control the temperature pressure and uniformity of the fluid 3.

The advantage of the heater-mixer of the present invention is that it allows heating and mixing of the stored fluid while eliminating expensive, complicated, hazardous and relatively heavy motors and fans and their required electrical wiring from within the storage vessel. The heating element 6 of the present invention, may be encased by a material compatible with the stored fluid, i.e., inert thereto, while electrical wiring and circuits for electrical motors are much more difficult if not impossible to encase and to render inert to the stored fluid.

I claim:

1. In a fluid storage apparatus, a fluid storage vessel for containing fluid to be stored, an auxiliary chamber defined within said vessel and being disposed in heat exchanging relation with the fluid to be stored within said vessel, fluid passageway means interconnecting said vessel and said auxiliary chamber for providing fluid communication between said vessel and said chamber, means disposed in heat exchanging relation with said auxiliary chamber for cyclically heating said chamber and the fluid contents thereof for causing said fluid contents to be expanded and to be expelled from said chamber into said storage vessel for heating and mixing stored fluid contents of said vessel.

2. The apparatus of claim 1 wherein said fluid storage vessel is a cryogenic fluid storage vessel for storing liquified gases.

3. The apparatus of claim 1 wherein said heating means comprises a heating element carried on the wall of said auxiliary chamber.

4. The apparatus of claim 3 wherein said heating element is an electrical resistance heating element.

5. The apparatus of claim 1 wherein said heating element consists of tubulation for circulating warm fluid or gas.

6. The apparatus of claim 1 wherein said fluid passageway means interconnecting said vessel and said chamber includes, a jet nozzle for directing a jet stream of heated fluid into said vessel from said auxiliary chamber.

7. In a method for mixing stored fluids contained in a storage vessel the steps of, confining a portion of the stored fluid within a limited region of the vessel, heating the confined portion of fluid to expand same, expelling the heated and expanded fluid from the limited region of the vessel into the remaining portion of the vessel for mixing the stored fluid, cooling the unexpelled portion of the confined and heated fluid to allow same to contract and to draw replacement fluid into the confined region of the stored fluid from the storage vessel, and sequencing the heating and cooling cycle of the fluid within the limited region of the vessel to maintain mixing of the stored fluid.

8. The method of claim 7 including the step of, constricting the cross-sectional dimensions of the fluid flow passageway between the limited region of the vessel and the remaining portion of the vessel to obtain a jet of fluid expelled from the limited region into the remaining portion of the stored fluid to enhance mixing of the stored fluid.

* * * * *